June 17, 1958   M. H. SPEARING   2,839,707
ELECTRICAL APPARATUS
Filed May 1, 1956   3 Sheets-Sheet 1

INVENTOR:
Michael Henry Spearing
by Albert H. Jackson
ATTORNEY

United States Patent Office 2,839,707
Patented June 17, 1958

2,839,707

ELECTRICAL APPARATUS

Michael Henry Spearing, Epsom Downs, England, assignor to The Distillers Company Limited, Edinburgh, Scotland, a British company Application May 1, 1956, Serial No. 581,978

Claims priority, application Great Britain May 13, 1955

8 Claims. (Cl. 315—163)

The present invention relates to electrically actuated apparatus for controlling physical quantities which are subject to variation, and in particular to apparatus in which control is effected by means of a thyratron.

The use of thyratrons in controlling apparatus for controlling the magnitude of a physical quantity subject to variation from a datum value is well known. In such apparatus the thyratron is brought into action by the departure of the quantity from its datum value and operates to work controlling means such as a heating element, a valve or other regulating member to restore the state of equilibrium. The apparatus may be arranged to give proportional control, that is to say, the output current from the thyratron is proportional to the departure of the physical quantity from its datum line, i. e., to the error of the system.

In such control applications the anode of the thyratron is fed with a sinusoidal alternating voltage, and is arranged to give a variable output current proportional to the error of the system by altering the time during which the thyratron conducts in each half-cycle (with a single thyratron there is no conduction during negative half-cycles of the supply). This is achieved by varying the instant in the positive half-cycle at which the thyratron strikes. The normal method of striking a thyratron is to reduce the negative grid bias to the critical grid voltage value, and this can be achieved by applying a D. C. or A. C. voltage to the grid, or by feeding the grid from a pulse source, to intercept the critical grid characteristic. The time during which the thyratron conducts in each positive half-cycle is varied by altering the grid bias level in the case of D. C. Where the grid is fed with A. C. or from a pulse source the time can be varied by shifting the phase of the A. C. sine wave or of the pulses relative to the anode voltage of the thyratron. The grid can also be fed with A. C. in series with an adjustable direct bias. Figures 1 and 2 of the accompanying drawings illustrate the control of a thyratron in this way using a pulse source.

Hitherto it has not been possible to achieve a degree of control of the conducting time of the thyratron sufficiently accurate for many applications. If consistent and accurate striking of the thyratron is to be achieved the striking signal must intercept the critical grid characteristic at a steep angle to the time scale and this is not possible with D. C. or A. C., except in the case of a high amplitude A. C. current, the use of which is undesirable for other reasons. Where a pulse source or high amplitude A. C. is used a steep striking angle is obtained but the phase shifting mechanism for varying the conducting time cannot be made sufficiently sensitive. The phase shift may be carried out mechanically, in which case the control achieved is coarse, or electrically, in which case it is necessary to employ complex circuits comprising one or more valves possibly linked up with a servo mechanism, the whole system being inflexible and requiring critical and frequent adjustments.

It is an object of the present invention to provide a controlling apparatus of this type giving more sensitive and accurate control than has hitherto been possible.

Accordingly, the present invention comprises an electrically-actuated controlling apparatus in which a thyratron is adapted to be supplied with alternating current to operate means for correcting the magnitude of a physical quantity, subject to variation from a datum value, in response to an error signal from detecting means, and producing an output current having a component proportional at any instant to the departure of the quantity from its datum value, wherein the thyratron is associated with a multivibrator which is adapted (a) to operate at a frequency synchronised with or locked to a multiple or sub-multiple of the alternating current supply, (b) to receive the error signal from the detecting means, and (c) to produce an anode circuit voltage which is applied to the grid of the thyratron as a striking signal, whereby the mark to space ratio of the anode circuit current of the multivibrator is controlled by the error signal thereby controlling the instant at which the thyratron strikes in each positive half-cycle.

The multivibrator is a well known type of relaxation oscillator, being essentially a two-stage resistance coupled amplifier in which the voltage developed at the output of each valve is applied to the grid of the other valve. When supplied with a direct current the multivibrator oscillates, i. e., the anode current of one valve rapidly rises to a high value, while that of the second valve falls to zero, for a period depending on the choice of resistance and condenser values, after which the situation is reversed and the anode current of the second valve rises while that of the first valve falls to zero. The output current from the anode of either of the valves thus has a square wave-form with a steep leading edge. The multivibrator can be adapted to oscillate at any desired frequency and may be readily synchronised by applying a regular pulse to the grid of one of the valves, which has the effect of "triggering" the valve.

The multivibrator, with which the thyratron in the controlling apparatus of the present invention is associated, is adapted to operate at an oscillation frequency synchronised with or locked to a multiple or sub-multiple of the frequency of the alternating current supplied to the thyratron, being preferably synchronised with that of the alternating current supply. The synchronisation may be carried out in various ways known in the art, for instance, mechanically or by means of a pulse generator. In a preferred embodiment the multivibrator is associated with a synchronising pulse generator. A reference phase sine wave, of the same frequency as the alternating current supplied to the thyratron, is developed from a transformer and fed into the pulse generator which first squares the wave and then differentiates it to give a series of alternating pulses of the same frequency as the original sine wave. The pulses are applied to the grid of the first valve of the multivibrator which is adapted, by a suitable choice of resistance and condenser values, to operate at a natural frequency of oscillation slightly lower than the frequency of the pulses, and to be "triggered" by the positive pulse but not by the negative pulse.

The error signal from the detecting means is supplied to the multivibrator at the grid of the second valve, as a direct bias to control the triggering of this valve. Thus while the first valve of the multivibrator is triggered to a frequency identical with that of the alternating current supplied to the thyratron, the triggering of the second valve is controlled by the degree of direct grid bias applied by the error signal. An alteration in the error signal thus causes an alteration in the instant during the cycle at which the second valve triggers, i. e., in the mark to space ratio of the anode circuit current of the second valve. In this specification the phrase "mark to space ratio" is used, in the conventional way, to refer to the ratio of the distance X to the distance Y in Figure 3.

The anode circuit voltage of the second valve of the multivibrator is applied to the grid of the thyratron as a striking signal. As this voltage has a square wave form with a steep leading edge the control obtained will be "stiff." If desired, however, the anode circuit current can be differentiated in a pulse generator similar to that employed in the synchronisation of the multivibrator so that the grid of the thyratron is fed with a series of pulses. It will readily be seen that an alteration of the mark to space ratio of the anode circuit current of the second valve of the multivibrator, caused by a particular error signal from the detecting means, will result in a corresponding alteration of the instant in the positive half-cycle at which the thyratron strikes, thus altering the time during which the thyratron conducts in each half-cycle, and giving an output current from the thyratron which is a function of the error of the system.

While control of the thyratron can be achieved at any phase relationship between the alternating current supplied to the thyratron and the anode current of the second valve of the multivibrator, to get stable control of the thyratron over the full half-cycle it is desirable not to reduce the mark to space ratio below a critical value. Therefore, the phase of the anode current of the multivibrator is preferably advanced to give a phase difference of between about 45° and 135°, and suitably about 90°. This can be achieved by incorporating a conventional phase shifting device with the synchronising pulse generator.

It may be desirable to protect the thyratron with a negative grid bias so that under fault conditions, for instance, if the multivibrator failed, the thyratron will not conduct uncontrolled.

The present invention is further illustrated with reference to the accompanying drawings.

Figure 1:
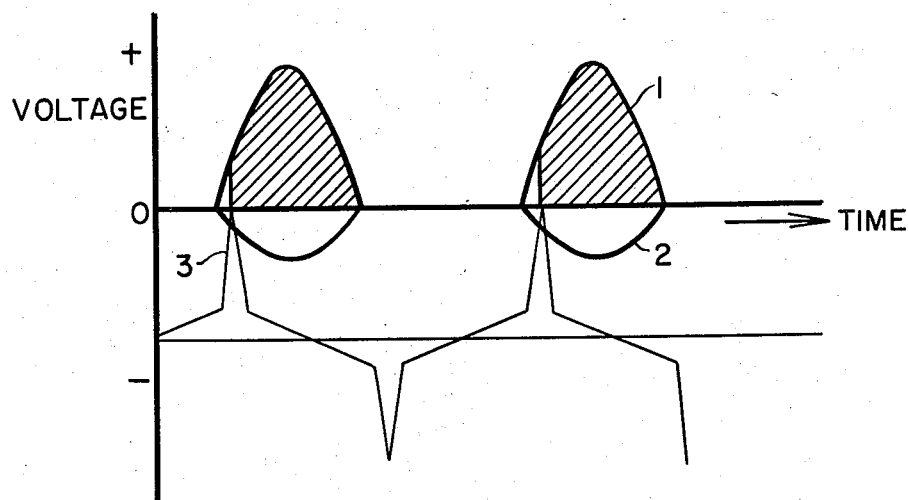
Figures 1 and 2 are graphs illustrating the control of a thyratron by means of a pulse source and phase-shifting network, as known in the prior art.
Figure 2:
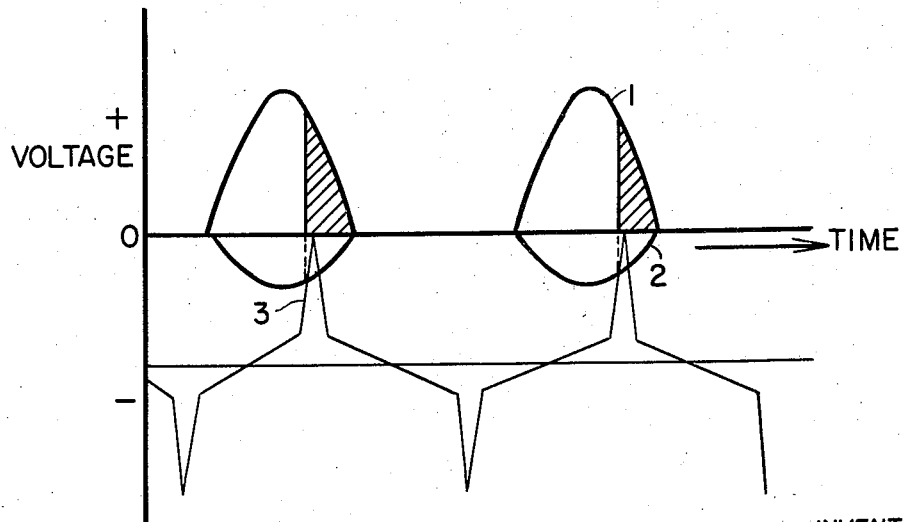

In Figures 1 and 2, which illustrate a method of controlling a thyratron known in the prior art, the curve 1 represents a sinusoidal alternating voltage fed to the anode of the thyratron. The curve 2 represents the critical grid characteristic of the thyratron, i. e., the grid voltage at which the valve starts to conduct for a particular anode voltage. The grid of the thyratron is fed from a pulse source in which the phase of the pulses, 3, is variable. The thyratron strikes at the instant at which the pulse cuts the critical grid characteristic, and the duration of the conducting periods of the thyratron is varied by shifting the phase of the pulses with respect to the alternating anode voltage. In Figure 1 the thyratron is conducting over nearly the whole half-cycle, the conducting period being shown by the shaded portion. In Figure 2, by shifting the phase of the pulses with respect to the alternating anode voltage, the conducting time of the thyratron is reduced to a small value.

Figure 3:
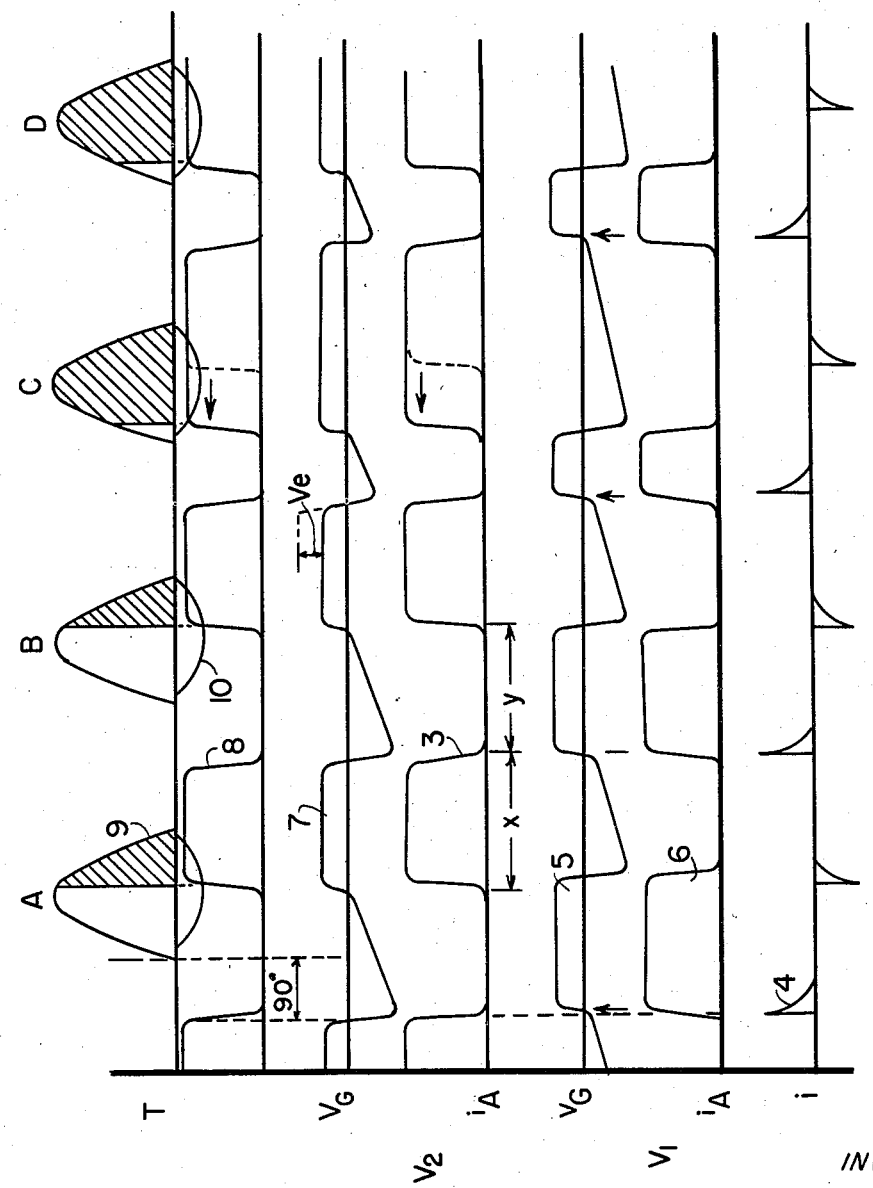
Figure 3 is a graph illustrating the synchronisation of a multivibrator and the effect of varying the mark to space ratio when the anode current of the second valve of the multivibrator is applied to the grid of the thyratron.

Figure 3 illustrates the control of a thyratron according to the present invention. The curve 4 illustrates the current output of a synchronising pulse generator S. The curves 5 and 6 are, respectively, the grid voltage and the anode current of the first valve $V_1$ of a multivibrator. Similarly, curves 7 and 8 show the grid voltage and anode current of the second valve $V_2$. Curve 9 is the alternating voltage applied to the anode of the thyratron T and curve 10 is the critical grid characteristic of the thyratron.

The synchronising pulses 4 generated by S, which have the same frequency as the thyratron alternating voltage 9 but have a phase difference of +90°; are applied to the grid of the valve $V_1$ as shown by the small arrows. The pulses trigger off the valve and synchronise the multivibrator to the thyratron. The anode current 8 of the valve $V_2$ is applied to the grid of the thyratron and causes the thyratron to strike in each positive half cycle at the moment it cuts the critical grid characteristic 10. It will be seen that in the half-cycles A and B, the thyratron is conducting, as shown by the shaded portion, for slightly less than half of the positive cycle.

Between the half-cycles B and C an error signal from the detecting means is applied to the grid of the valve $V_2$ as a voltage $V_c$, which reduces the negative bias of the grid. The result of this is to raise the grid voltage wave-form and to cause the interception of the grid cut-off voltage to occur earlier in the succeeding cycle, i. e., to advance the triggering of this valve. This alters the mark to space ratio of the anode current 8 of the valve $V_2$ giving a corresponding alteration in the instant in the positive half-cycle at which the thyratron strikes. The duration of the conducting period of the thyratron is thus increased, by an amount which is a function of the error of the system, to nearly the whole of the positive half-cycle.

Figure 4:
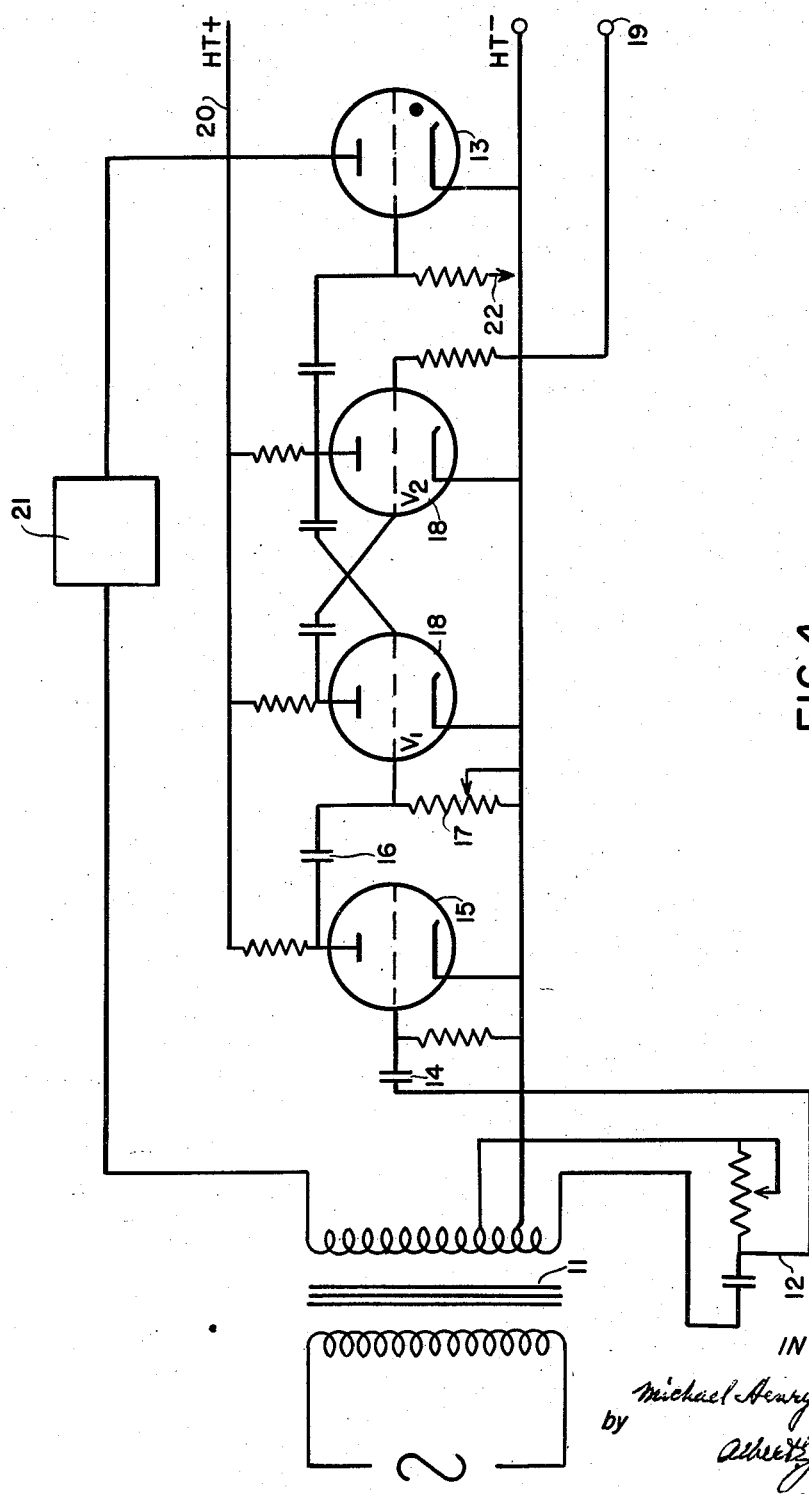
Figure 4 is a circuit diagram of a controlling apparatus according to the present invention.

Figure 4 is a circuit diagram of a preferred controlling apparatus according to the present invention. A reference phase sine wave is developed from the transformer 11 and fed into the phase shifting network 12 in which the phase of the sine wave can be advanced to give a phase difference of about +90° in advance of the alternating current supplied to the thyratron 13 from the transformer 11. The output from the phase shifting network passes through a D. C. blocking condenser 14 and is fed into the grid of the pulse-forming valve 15 which squares the wave. The squared wave is differentiated to form the synchronising pulses by means of a differentiating network formed by the coupling condenser 16 and the resistor 17 which is actually the grid resistance of the first valve of the multivibrator 18. The synchronising pulses are fed into the grid of this valve $V_1$. The detecting means (not shown) detect the departure from a datum value of the physical quantity under control and produce a control voltage which is applied between terminal 19 and HT—. The anode load for the pulse-forming valve 15 and for the two valves $V_1$ and $V_2$ of the multivibrator 18 is supplied from the source of high tension direct current 20. The anode circuit current of the valve $V_2$ is applied to the grid of the thyratron 13 as a striking signal. The anode of the thyratron is connected to the controlling means 21. A negative grid bias may, if desired, be applied to the thyratron by means of the connection 22.

For the purposes of illustration the application of the apparatus shown in Figure 4 to the proportional control of the temperature of an electric oven will now be described. In this case the anode output of the thyratron is applied to the heating elements of the oven, which represent the controlling means 21. The detecting means connected to terminal 19 may consist of a resistance thermometer, or other device, which will give an output voltage proportional to the temperature of the oven. When the system is in a state of equilibrium the heat supplied to the oven equals the heat lost to the surrounding atmosphere. If the ambient temperature falls the rate of heat loss will increase and the temperature of the oven will fall. This will result in a proportional alteration in the control voltage supplied by the detecting means to the multivibrator which will cause a corresponding increase in the conducting time of the thyratron thereby increasing the rate of heat input to the oven.

The increase in the rate of heat input will be proportional to the increase in the rate of heat loss.

In this illustration the controlling apparatus of the present invention has been adapted to give proportional control only. If desired, however, the invention may be used in conjunction with integral control, i. e., in the above illustration, to bring the temperature back to the datum value, and/or derivative control.

I claim:

1. Electrically actuated controlling apparatus comprising a thyratron adapted to be supplied with alternating current, means connected thereto and operated thereby for correcting the magnitude of a physical quantity, subject to variation from a datum value, detecting means providing an error signal to which said thyratron is responsive, said thyratron producing an output current having a component proportional at any instant to the departure of the physical quantity from its datum value, and a multivibrator in circuit with said thyratron and adapted (a) to operate at a frequency synchronized with or locked to a multiple or sub-multiple of the alternating current supply, (b) to receive the error signal from the detecting means, and (c) to produce an anode circuit voltage which is applied to the thyratron grid as a striking signal, whereby the mark to space ratio of the anode circuit current of the multivibrator is controlled by the error signal thereby controlling the instant at which the thyratron strikes in each positive half-cycle.

2. Apparatus as claimed in claim 1, wherein a synchronizing pulse generator is connected in circuit with the multivibrator for synchronizing the multivibrator with the alternating current supply.

3. Apparatus as claimed in claim 2, wherein the multivibrator includes a valve having a grid at which synchronizing pulses of the synchronizing pulse generator are received, to operate at a natural frequency of oscillation slightly lower than the frequency of the pulses, and to be triggered only by the positive pulse.

4. Apparatus as claimed in claim 2, wherein the multivibrator includes two valves each having a grid, synchronizing pulses of the synchronizing pulse generator being received at the grid of one valve, and the error signal from the detecting means being received at the grid of the other valve as a direct bias to control the triggering of the said other valve.

5. Apparatus as claimed in claim 1, wherein the anode circuit voltage from the multivibrator is differentiated in a pulse generator before being applied to the grid of the thyratron.

6. Apparatus as claimed in claim 1, wherein the multivibrator is adapted to operate with an anode current phase difference between about 45° to 135° in advance of the alternating current supplied to the multivibrator.

7. Apparatus as claimed in claim 1, wherein the multivibrator is adapted to operate with an anode current phase difference about 90° in advance of the alternating current supplied to the multivibrator.

8. Apparatus as claimed in claim 1, wherein a phase-shifting network is associated with the multivibrator.

References Cited in the file of this patent

UNITED STATES PATENTS

| | | |
|---|---|---|
| 2,428,926 | Bliss | Oct. 14, 1947 |
| 2,440,253 | Dodington | Apr. 27, 1948 |
| 2,465,185 | Anderson | Mar. 22, 1949 |
| 2,567,851 | Lipkin | Sept. 11, 1951 |